April 25, 1967   G. J. BANEY ET AL   3,315,316
APPARATUS FOR MOLDING FLUID SEAL ELEMENTS
Filed March 5, 1965   2 Sheets-Sheet 2
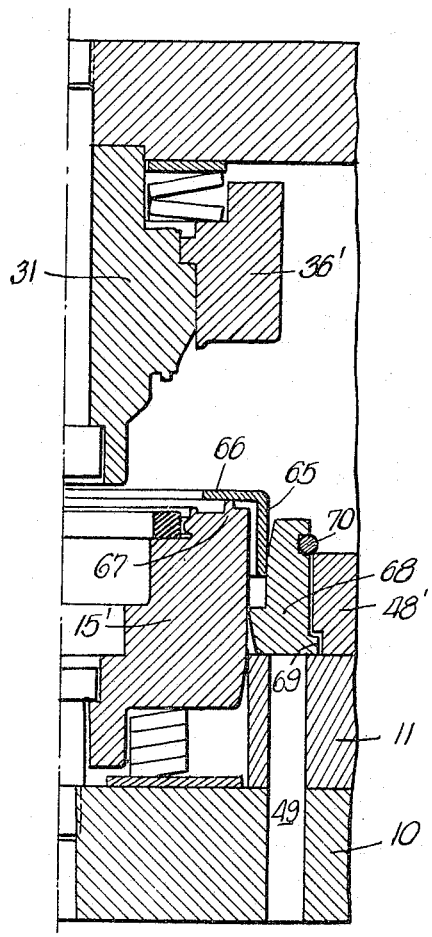
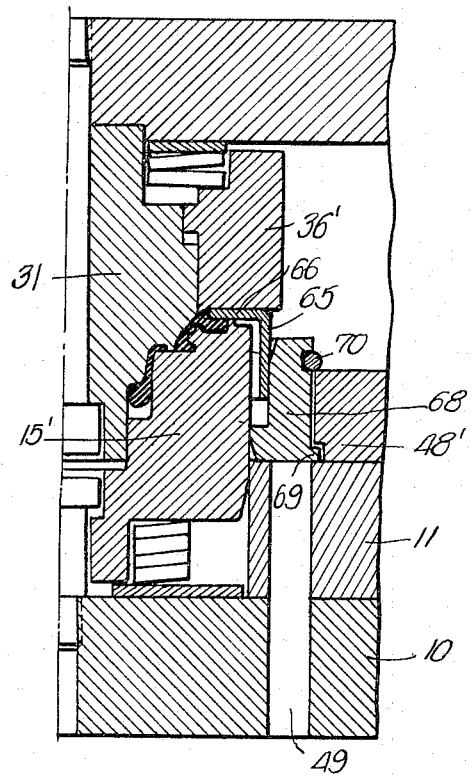
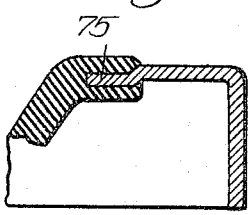
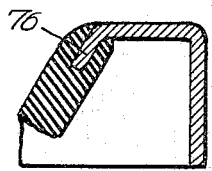
Inventors:
George J. Baney,
Warren W. Rasmussen.
By George H. Simmons
Atty.

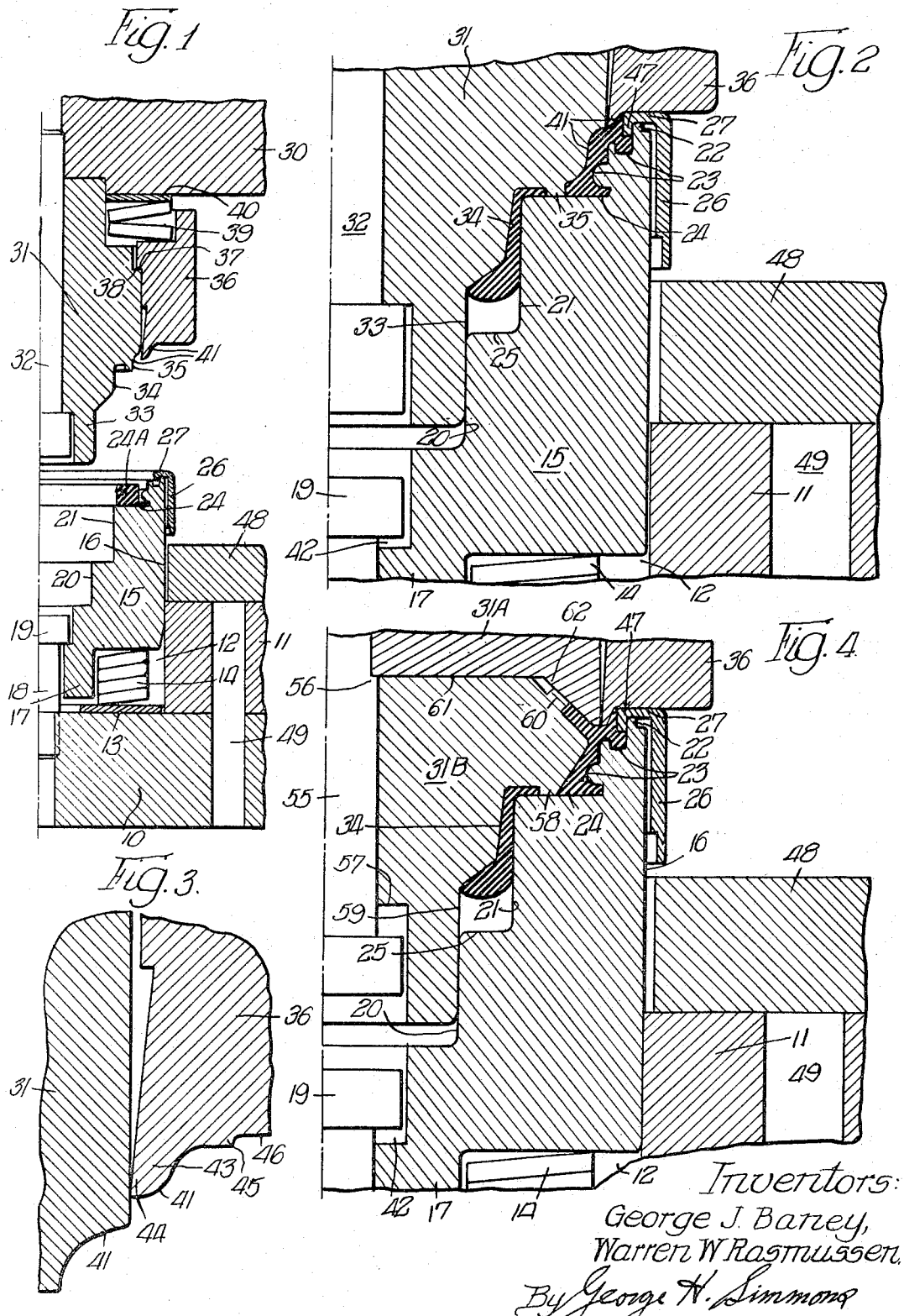

United States Patent Office 3,315,316
Patented Apr. 25, 1967

3,315,316
APPARATUS FOR MOLDING FLUID SEAL ELEMENTS
George J. Baney, Maywood, and Warren W. Rasmussen, Elmhurst, Ill., assignors to Victor Manufacturing & Gasket Company, Chicago, Ill., a corporation of Illinois
Filed Mar. 5, 1965, Ser. No. 437,423
11 Claims. (Cl. 18—36)

This invention relates to apparatus for molding the sealing elements of metal encased fluid sealing devices and bonding the elements onto the metal shells of the devices, and has for its principal object the provisions of new and improved apparatus of this kind.

It is a main object of the invention to provide, in a multi-cavity molding apparatus, spring means for supporting the lower mold parts in the apparatus which means insures that the pressure imposed upon each lower mold part by an upper mold part as the molding press moves into closed position, will be the same in each cavity of the apparatus even though the dimensions of the individual mold parts vary within manufacturing tolerance limits.

Another object of the invention is to provide pressure lands on the mold parts which have small surface areas so that the pressure exerted upon the surface engaged by the land will be sufficiently high to render the mold flashless.

Another object of the invention is to provide a pressure land on each lower mold part that engages the annular wall of the sealing device shell to support the shell upon the mold part during molding.

Another object of the invention is to provide on the upper mold part a clamping ring that contains a pressure land that engages the annular wall of the sealing device shell to clamp the shell upon the lower mold part during molding.

Another object of the invention is to provide spring means engaging the clamping ring and exerting a constant pressure thereon in all positions of the clamping ring.

Further objects of the invention, not specifically mentioned here will be apparent from the detailed specification and claims which follow, reference being had to the accompanying drawings in which a preferred embodiment of the invention is shown by way of example and in which:

FIG. 1 is a fragmentary cross-sectional view through a mold in open position and loaded ready for a cycle of operation;

FIG. 2 is a view similar to FIG. 1 drawn to an enlarged scale and showing the mold in fully closed position;

FIG. 3 is a fragmentary view drawn to a still larger scale showing the details of the clamp ring;

FIG. 4 is a view similar to FIG. 2 showing a mold arranged to form a double lip sealing element;

FIG. 5 is a view similar to FIG. 1 showing a mold usable with a particular shell;

FIG. 6 is a view of the mold shown in FIG. 5 in fully closed position;

FIG. 7 is a fragmentary cross-sectional view showing a different sealing device that can be molded in the embodiment shown in FIGS. 5 and 6; and FIG. 8 is a view similar to FIG. 7.

In the commercial production of metal encased fluid sealing devices, multi-cavity molding apparatus is used to form the sealing element and to bond it to the metal shell of the device. Such apparatus usually includes a lower mounting plate fixed upon the lower platen of the molding press. Secured upon this mounting plate are a plurality of lower mold parts. These mold parts usually contain a cavity forming surface shaped to form the outer surface of the sealing element. The parts also contain a means for supporting thereon a quantity of the material from which the sealing element is to be molded. This material is usually an elastomer.

The molding apparatus also includes an upper mounting plate fixed upon the upper platen of the molding press. Upper mold parts are secured upon this mounting plate. Each upper mold part contains a cavity forming surface shaped to form the inner surface of the sealing element, a surface for clamping the shell upon the lower mold part and a surface for engaging the lower mold part to close off a cavity in the mold parts.

Proper molding and curing of elastomers requires the application thereto of a specific pressure at a specific temperature for a specific time. The platens of molding presses being heated uniformly and the closed time of the press being accurately controlled, the applied pressure is the factor most likely to vary. If the surfaces on the upper mold part that engage the lower part do not lie in a common plane, pressure on the material in the mold cavities will vary. The same is true if the surfaces on the lower mold part that are engaged by the upper mold part do not lie in a common plane. Under these conditions non-uniform quality of the sealing elements may result.

The present invention seeks to provide molding apparatus capable of maintaining uniform pressure in each cavity of a multi-cavity mold even though the dimensions of the mold parts vary within commercial limits. To this end a plate fixed upon the lower mounting plate contains a plurality of openings each of which, with the mounting plate, forms a socket. A spring stack is positioned in each socket. Each lower mold part projects into this socket and is supported by the spring stack therein. A cap screw threaded into the mounting plate secures the mold part upon the spring with the bottom of the mold part spaced from the mounting plate.

The upper mold part is secured to the upper mounting plate and is equipped with a spring pressed clamp ring. As the press closes, a pressure land on the clamp ring engages the shell on the lower mold part prior to completion of the downward movement of the mold part. As this movement continues the clamp ring moves upwardly against its springs. A pressure land on the upper mold part engages the quantity of elastomer on the lower mold part, and forces it into the cavity. The pressure land on the upper mold part closes the cavity and pinches off excess material as it moves into engagement with the lower mold part. This occurs before the closing of the press is completed. Further downward movement of the upper mold part forces the lower mold part downwardly thereby compressing the springs that support it. When the press is fully closed, each mold therein is closed under the same pressure as every other mold, within narrow limits notwithstanding that there may be manufacturing tolerance variations in the various parts.

In the preferred embodiment of the invention the springs that support the lower mold part and the springs that urge the clamp ring downwardly are dished washer or so-called Belleville springs. This type of spring is advantageous since it enables a heavy duty spring to be fitted in a small space. These springs when so designed are also advantageous since the resistance of the spring increases rapidly, upon initial deflection, to an essentially constant value throughout the working range of the spring.

The shell to which the sealing element is to be bonded is supported upon the lower mold part by a narrow pressure land and is engaged by a narrow pressure land upon the upper mold part. Since these lands have small area the pressures exerted thereby on the shell are high in pounds per square inch and the mold is rendered flashless at the junction of the sealing element and the shell. In certain instances the pressure land on the lower mold part serves also to hold a shell on the mold part concentrically by engagement of the land with an inner cylindrical wall on the shell. In other instances the shell is centered on the mold part by means engaging the outer cylindrical wall of the shell in the usual manner.

Referring now to the drawings in more detail; in FIGS. 1 and 2 it will be seen that the apparatus of the present invention consists of a lower mounting plate 10 that is adapted to be fixed on and supported by the lower platen of a molding press. Fixed upon the base plate 10 is a cavity locating plate 11 which contains openings which, with the plate 10, form mold receiving sockets 12.

Located in each of the sockets 12 is a washer 13 preferably composed of hardened steel and upon which a spring stack 14 is disposed. As shown, the spring stack 14 consists of a plurality of dished washer or so-called Belleville springs nested together. This arrangement results in the spring stack having a resistance to deflection equal to the sum of the resistances of the individual springs in the stack. The amount of deflection of the stack from relaxed to fully operated position is the same as that of the individual springs.

Mounted upon the spring stack 14 is a lower mold part 15 the outer diameter 16 of which is dimensioned for sliding fit in the opening in the cavity locating plate 11. Projecting from this mold part 15 is a cylindrical boss 17 which telescopes into the spring stack 14. Extending through the boss 17 is a cap screw 18 that is threaded into the plate 10 and contains a head 19 that engages a shoulder in the mold part to limit the upward movement of the mold part 15 with respect to the base plate 10. It will be noted that when the head 19 engages the shoulder, the bottom of boss 17 is disposed a short distance above the washer 13.

Mold part 15 contains inwardly facing cylindrical walls 20 and 21 for a purpose hereinafter described.

As will be seen best in FIG. 2 the mold part 15 contains at its upper end and near its outer periphery, a pressure land 22 and surfaces 23 which together define a portion of the outer surface of sealing elements to be molded in the press.

Extending radially inwardly from the surface 23 is an annular wall 24 the inner edge of which merges into the cylindrical wall 21. A second annular wall 25 extends between cylindrical walls 21 and 20.

To load the mold a ring of uncured material 24A is placed upon the annular wall 24 and a metallic shell 26 is supported on the mold part by engagement of the pressure land 22 with the annular wall 27 of the shell.

The molding apparatus also consists of an upper mounting plate 30 adapted to be fixed upon the upper platen of the molding press and to which an upper mold part 31 is fixed in convenient manner such as by a cap screw 32 that is threaded into the mounting plate 30 with its head engaging a shoulder in the mold part.

The upper mold part 30 contains a lower cylindrical boss 33 the outer diameter of which is dimensioned for sliding fit engagement with the cylindrical wall 20 of the lower mold part. A second cylindrical wall 34 is dimensioned for clearance fit with the wall 21 of the lower mold part. A pressure land 35 depends from the mold part 31 and is spaced outwardly from the wall 34.

Encircling the mold part 31 is a clamp ring 36 containing a downwardly facing shoulder 37 that engages upwardly facing shoulder 38 on the mold part. Also encircling the mold part 31 is a stack of Belleville springs 39 that engage a shoulder on ring 36 and a hardened washer 40 that rests on the mounting plate 30. Springs 39 urge the ring 36 downwardly to maintain shoulders 37 and 38 engaged with each other. It will be noted that the individual springs 39 in the stack are positioned in opposition. Through this arrangement the resistance to deflection by the spring stack is no greater than that of the individual springs. The distance that the stack can be deflected, hence the distance that ring 36 can be moved upwardly, is equal to the sum of the distances the individual springs can be deflected. As shown the stack consists of two springs, but the use of a greater number of springs in the stack is contemplated.

Located upon the mold part 31 and the clamp ring 36 are surfaces 41 which together shape the cavity to form the inner surface of the sealing element.

As will be seen best in FIG. 2, as the press is being closed the pressure land 35 engages the moldable material 24A forcing the same into the cavity formed between the upper and lower mold parts. During this movement the outer surface 33 on the mold part 31 slides on the wall 20 of the lower mold part thereby to insure proper registration of the mold parts, one with the other. Further downward movement of the mold part 31 pinches off excess moldable material which flows into the dump formed between the walls 33 and 21 of the mold parts. As the press moves into fully closed position, engagement of the pressure land 35 with the annular wall 24 of the lower mold part forces that mold part downwardly against the resistance of the spring stack 14 as is indicated by the space 42 between the cap screw head 19 and the surface in the boss 17 of the lower mold part. During this movement of the mold part 31 downwardly the clamp ring 36 engages the shell wall 27 before the downward movement has been completed and further downward movement causes the clamp ring 36 to move upwardly against the resistance of the springs 39. Through this arrangement the shell is clamped on the lower mold part under accurately controlled predetermined pressure.

The clamp ring 36 is preferably made out of steel and hardened. As will be seen best in FIG. 3, a lip portion 43 projects downwardly from the lower end of the ring 36 at the inner edge thereof. The tip of the lip 43 is dimensioned for interference fit with the mold part 31 as indicated at 44. This fit results in sufficient radial pressure between the ring and mold part to render the mold flashless at this point. Surfaces 41 on the mold part 31 and on the lip 43 together define the inner surface of the cavity in the mold.

Surface 41 on the ring 36 blends into a small pressure land 45 that depends from the bottom end 46 of the ring. In one instance land 45 was offset from end 46 a distance of .007 of an inch. As a result of this construction when the mold is in fully closed position land 45 indents into the shell sufficiently to move end 46 into engagement with wall 27 of the shell and the mold is rendered flashless at the junction of the sealing lip and the shell.

While the configuration of the bottom end of the clamping ring 36 shown in FIG. 3 is a preferred form, the use of other configurations and structural details are contemplated within the teachings of the invention.

The metallic shell 26 shown in FIGS. 1 and 2 contains an inner cylindrical wall 47 which engages the inner surface of the pressure land 22 on the lower mold part to center the shell on the mold part. It will be observed that the outer cylindrical wall is spaced outwardly from the outer surface 16 of the mold part 15 and as a result the mold parts shown are capable of molding sealing elements and bonding the same onto metallic shells, the diameters of the outer walls of which vary greatly. Since the pressure land 22 on the lower mold part and the pressure land 45 on the clamp ring 36 both have a small surface area in engagement with the shell; the pressure between the lands and the shell is sufficient to render the mold flashless at the junction of the sealing element and the shell. The surface area of the pressure land 35 is likewise small and as a result the pressure exerted thereby on the surface 24 is sufficient to render the mold flashless or at least substantially flashless at this point.

From the foregoing it will be apparent that upon closing of the press and engaging of the upper mold part thereon with the lower mold part results in movement downwardly of the lower mold part against the resistance of the spring stack that supports it. The resistance to deflection of the springs used rises rapidly upon the initial application of a load thereto, remains essentially constant through most of the deflection range, then falls off as the spring approaches flatness. In the mold shown, the initial deflection of the spring occurs before the press fully closes, and the maximum deflection capability of the springs is greater than is required during full closure of the press. Thus, during the working range of the spring stack 14, the resistance thereof is essentially constant.

This characteristic of the spring stack 14 results in uniform pressure between the parts in each and every one of the molds in the multi-cavity apparatus. Since each of the lower mold parts is moved downwardly as the press moves into fully closed position the pressure between that part and the upper mold part that engages it will be constant notwithstanding that there may be dimensional variations of the parts within commercial tolerance limits. Thus, the mold shown in FIGS. 1 and 2 when used in a multi-cavity molding apparatus is capable of maintaining uniform pressure on the material in the various cavities of the apparatus throughout the cycle of operation of the press. As a result, uniform quality of sealing elements by the apparatus is assured.

At the end of the cycle the press opens, moving the upper platen upwardly. This movement removes the pressure from the lower mold part 15, permitting the spring stack 14 to move the part upwardly until the head 19 of the cap screw re-engages the shoulder in the mold part.

The apparatus is equipped with a stripper plate 48 which contains an opening through which the mold part 15 projects. Plates 10 and 11 contain aligned openings 49 through which the stripper pins of the press, not shown, are projected. These pins move the plate 48 upwardly causing it to strip the sealing device from the mold part. The sealing devices and excess material in the dumps are then removed preparatory to loading the apparatus for the next cycle of operation of the press.

The mold shown in FIGS. 1 and 2 is designed to mold a single lip sealing element and to bond the same onto a shell that has an inner cylindrical wall to which the sealing element is bonded. In FIG. 4 we have shown a modification that enables the mold to form a double lip sealing element.

In the embodiment shown in FIG. 4 the lower mold part 15 and elements associated therewith are unchanged. The upper mold part is in two sections 31–A and 31–B, the section 31–A being fixed upon the upper mounting plate, not shown, by a collared cap screw 55 having a shoulder 56 that engages the section and clamps it upon the mounting plate as the screw is threaded into the plates.

The lower section 31–B contains a shoulder 57 which engages the head of the cap screw to support the section below the section 31–A when the press is open. Section 31–B has a pressure land 58, adapted to engage wall 24, and a cylindrical wall 59 dimensioned for sliding fit with the wall 20 of the mold part 15. The section also contains a pressure land 60.

As the press moves towards closed position land 58 engages the moldable material that is on surface 24 and section 31–B is then moved upwardly by further movement of the press, this movement continuing until upper surface 61 of section 31–B engages mold section 31–A. Pressure land 60 will then engage section 31–A, and with surface 62 will close off the cavity that forms the second sealing lip. When the press moves into fully closed position land 58 engages surface 24 to close off the cavity after pinching off excess material which falls into the dump, as before. The shell 26 is clamped upon the land 22 by clamp ring 36 as before.

At the completion of the cycle the press opens permitting the section 31–B to drop away from section 31–A and to re-register shoulder 57 with the head of cap screw 55. Further upward movement strips mold part 31–B from the sealing element after which the sealing device is stripped from the mold by the action of stripper plate 48.

In FIGS. 1, 2 and 4, the apparatus is adapted for use with shells having concentric inner and outer cylindrical walls. The teachings of the invention are not limited to molds designed for use with such shells.

In FIGS. 5 and 6 we have shown a sealing device shell having an outer cylindrical wall 65 from one end of which an annular wall 66 projects radially inwardly. Lower mold part 15' is the same as mold part 15 except that the pressure land 67 is positioned so as to include in the cavity a portion of wall 66 that is sufficient to provide a bonding area large enough to insure that the sealing element will be secured to the shell.

The stripper plate 48' contains an opening through which mold part 15' projects, which opening is large enough to accommodate a centering ring 68. A rib 69 on ring 68 projects into a counterbore in plate 48'. The wall 65 of the shell engages ring 68 to center the shell on the mold part 15'.

The upper mold part 31 is the same as in FIG. 1 and is equipped with a clamp ring 36' shown to have greater radial-thickness than ring 36 but otherwise being the same. The method of mounting and the operation of part 31, ring 36' and part 15' is the same as fully described hereinbefore and need not be repeated. In FIG. 6 the mold shown in FIG. 5 is shown in closed position. As the end of the molding cycle the press opens and press ejector pins, not shown, extend through openings 49 to raise ring 68 and plate 48' and thereby strip the finished sealing device from the mold.

In FIG. 7 we have shown a shell having an offset portion 75 in its annular wall, to which portion the sealing element is bonded. In FIG. 8 the shell has a frusto-conical portion 76 to which the sealing element is bonded. These are examples of shell shapes that can be used in the mold shown in FIGS. 5 and 6.

From the foregoing it will be apparent that the arrangement for spring supporting the lower mold part and use of a spring pressed clamp ring on the upper mold part is advantageous in both multi and single cavity molding apparatus. The arrangement insures uniform pressure on the material in the mold cavity notwithstanding dimensional differences in the mold parts due to manufacturing tolerances therein. The molds are of simple design, are rugged and capable of operating through a large number of press cycles before overhaul becomes necessary.

While we have chosen to illustrate our invention by showing and describing a preferred embodiment of it, we have done so by way of example only as there are many modifications and adaptations which can be made by one skilled in the art within the teachings of the invention.

Having thus complied with the statutes and shown and described a preferred embodiment of our invention, what we consider new and desire to have protected by Letters Patent is pointed out in the appended claims:

What is claimed is:

1. Apparatus for molding a sealing element and bonding the same onto a metal shell that has an outer cylindrical wall and an annular wall projecting inwardly from one end of the cylindrical wall, said apparatus comprising:

(a) a lower mold part having a cavity forming surface shaped to form the outer surface of the sealing element;

(b) means including springs for yieldingly supporting said mold part;

(c) a pressure land on said mold part adapted to engage the annular wall of a shell to support the shell of the mold part;

(d) means engaging the shell to center the same on the mold part;

(e) an upper mold part having a cavity forming surface shaped to form the inner surface of the sealing element and having an upwardly facing shoulder;
(f) inter-engageable means on said upper and lower mold parts for aligning the same axially;
(g) a clamping ring encircling said upper mold part and having a downwardly facing shoulder;
(h) spring means for normally maintaining said shoulders in engagement with each other;
(i) a pressure land on said clamping ring adapted to engage the annular wall of a shell to clamp the same onto the pressure land on the lower mold part;
(j) and a pressure land on said upper mold part adapted to engage the lower mold part to close off a cavity in the parts, and, as the apparatus moves into closed position, to move the lower part downwardly against its supporting springs, said clamping ring being thereby moved upwardly against said spring means.

2. Apparatus as specified in claim 1 in which the lower mold part is cylindrical in shape and has an outer diameter that is less than the diameter of the inner face of the cylindrical outer wall of the shell.

3. Apparatus as specified in claim 2 in which there is a lower mounting plate upon which the lower mold part supporting springs are carried and to which the mold part is fixed by a cap screw that limits movement of the part by the spring.

4. Apparatus as specified in claim 3 in which a cavity-positioning plate fixed upon the mounting plate contains a cylindrical opening in which the supporting spring is positioned and into which the lower mold part telescopes.

5. Apparatus as specified in claim 2 in which the pressure land on the lower mold part is a narrow annular rib upstanding from the mold part, which rib serves also to close off the mold cavity at the point of contact of the rib with the shell.

6. Apparatus as specified in claim 5 in which the means for centering the shell on the lower mold part includes an inner cylindrical wall on the shell the outer surface of which is engaged by the inner surface of the pressure rib on the mold part.

7. Apparatus as specified in claim 2 in which the inter-engageable means for aligning the mold parts includes a cylindrical boss at the bottom of the upper mold part and a cylindrical counterbore in the lower mold part into which the boss telescopes.

8. Apparatus as specified in claim 2 in which a stripper plate encircles the lower mold part and in which the means for centering the shell upon that mold part includes a centering ring carried upon the stripper plate and engaging the outer surface of the outer cylindrical wall of the shell.

9. Apparatus as specified in claim 1 in which the lower mold part contains an annular wall that extends inwardly from the cavity forming surface thereof, which wall is adapted to receive a ring of the material from which the sealing element is to be formed, and in which the pressure land on the upper mold part pinches off said material and moves into engagement with said annular wall, as the mold moves into closed position, to close off the cavity.

10. Apparatus as specified in claim 9 in which the mold in closed position contains a dump into which the material pinched off by the pressure land is retained.

11. Apparatus as claimed in claim 1 in which the upper mold part is formed in two sections which between them contain a cavity forming surface shaped to form the inner surface of a two lip sealing element.

References Cited by the Examiner

UNITED STATES PATENTS

| | | |
|---|---|---|
| 2,451,912 | 10/1948 | Bradley. |
| 2,949,635 | 8/1960 | Chiero. |
| 3,246,369 | 4/1966 | Rhoads et al. |

J. SPENCER OVERHOLSER, *Primary Examiner.*

J. HOWARD FLINT, JR., *Examiner.*